June 28, 1966  C. L. DOMECK, JR., ET AL  3,258,117
AUTOMATIC MEANS FOR TESTING AND ASSORTING CIGARETTES
ACCORDING TO POROSITY
Filed Aug. 27, 1963  10 Sheets-Sheet 1

INVENTORS
CORNEAL LOUIS DOMECK, JR.
ROBERT SPIVEY
BY
Kane, Dalsimer and Kane
ATTORNEYS June 28, 1966 C. L. DOMECK, JR., ET AL 3,258,117
AUTOMATIC MEANS FOR TESTING AND ASSORTING CIGARETTES
ACCORDING TO POROSITY
Filed Aug. 27, 1963 10 Sheets-Sheet 2

INVENTORS
CORNEAL LOUIS DOMECK, JR.
ROBERT SPIVEY
BY
Kane, Dalsimer and Kane
ATTORNEYS June 28, 1966 C. L. DOMECK, JR., ET AL 3,258,117
AUTOMATIC MEANS FOR TESTING AND ASSORTING CIGARETTES
ACCORDING TO POROSITY
Filed Aug. 27, 1963 10 Sheets-Sheet 3
FIG. 3
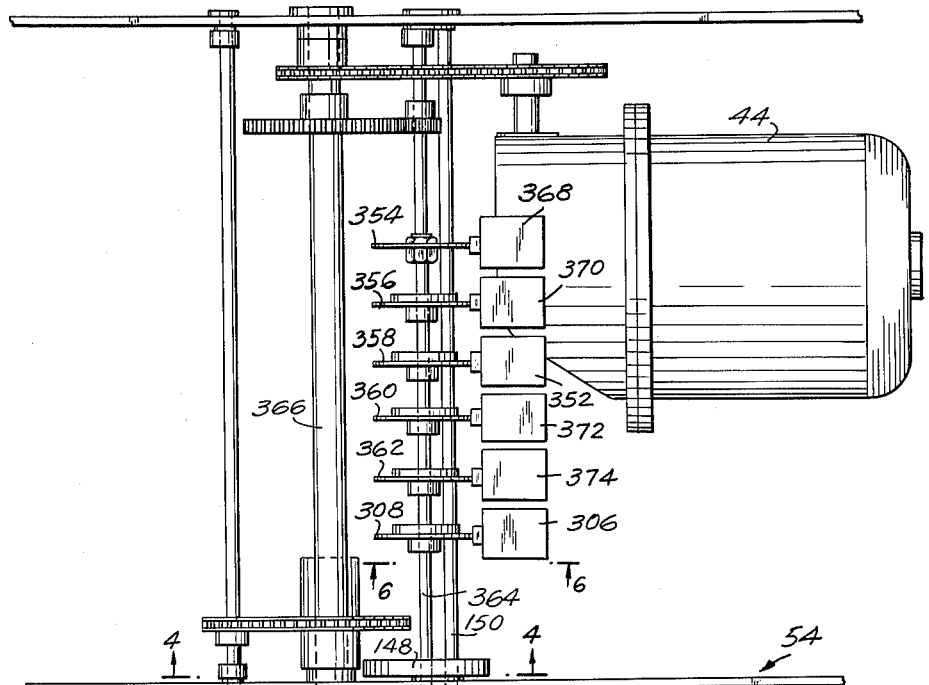
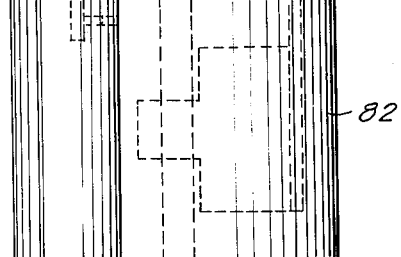
FIG. 4
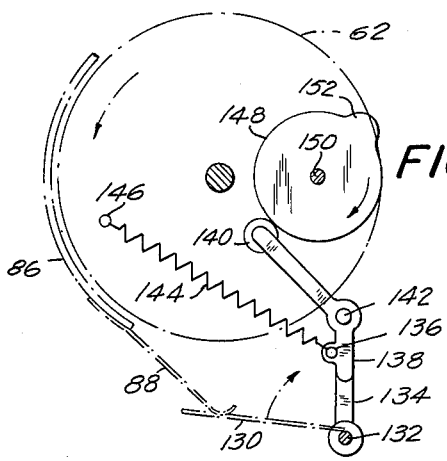
FIG. 5
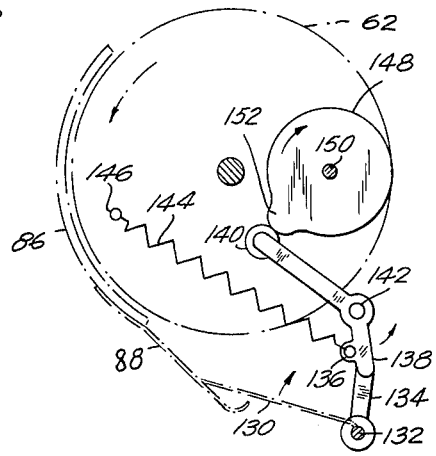
INVENTORS
CORNEAL LOUIS DOMECK, JR.
ROBERT SPIVEY
BY
Kane, Dalsimer and Kane
ATTORNEYS

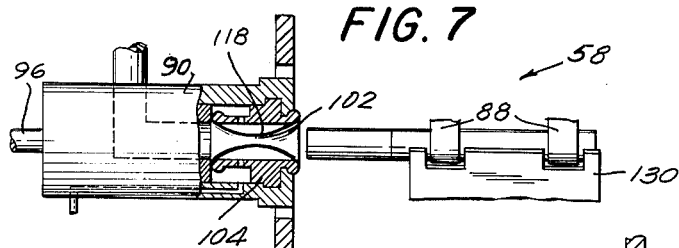
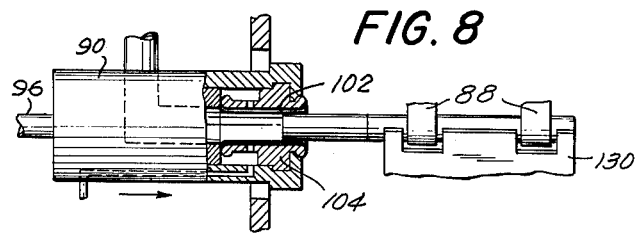
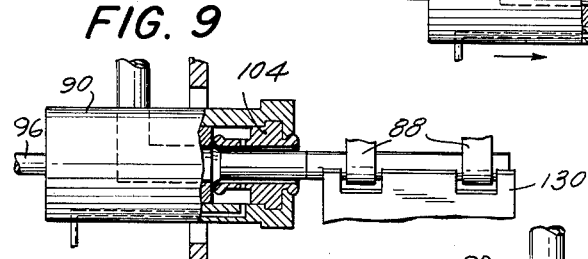
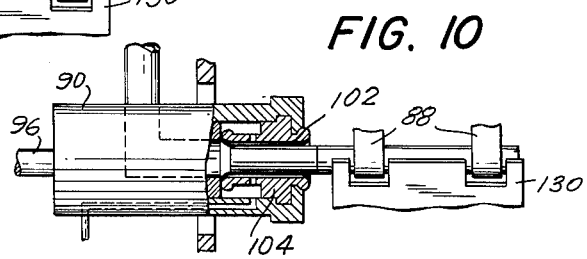
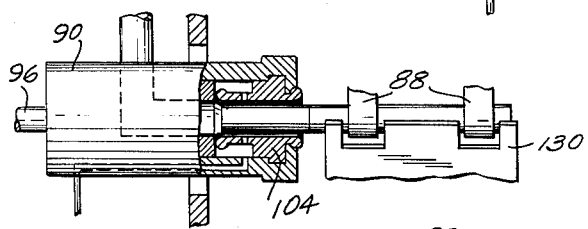
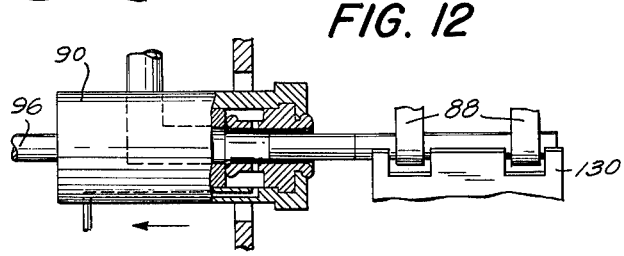
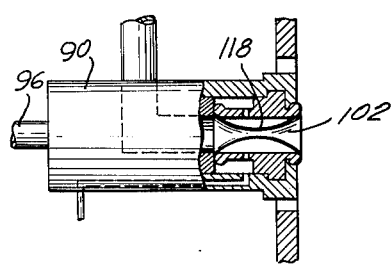
INVENTORS
CORNEAL LOUIS DOMECK, Jr.
ROBERT SPIVEY June 28, 1966 C. L. DOMECK, JR., ET AL 3,258,117
AUTOMATIC MEANS FOR TESTING AND ASSORTING CIGARETTES
ACCORDING TO POROSITY
Filed Aug. 27, 1963 10 Sheets-Sheet 6
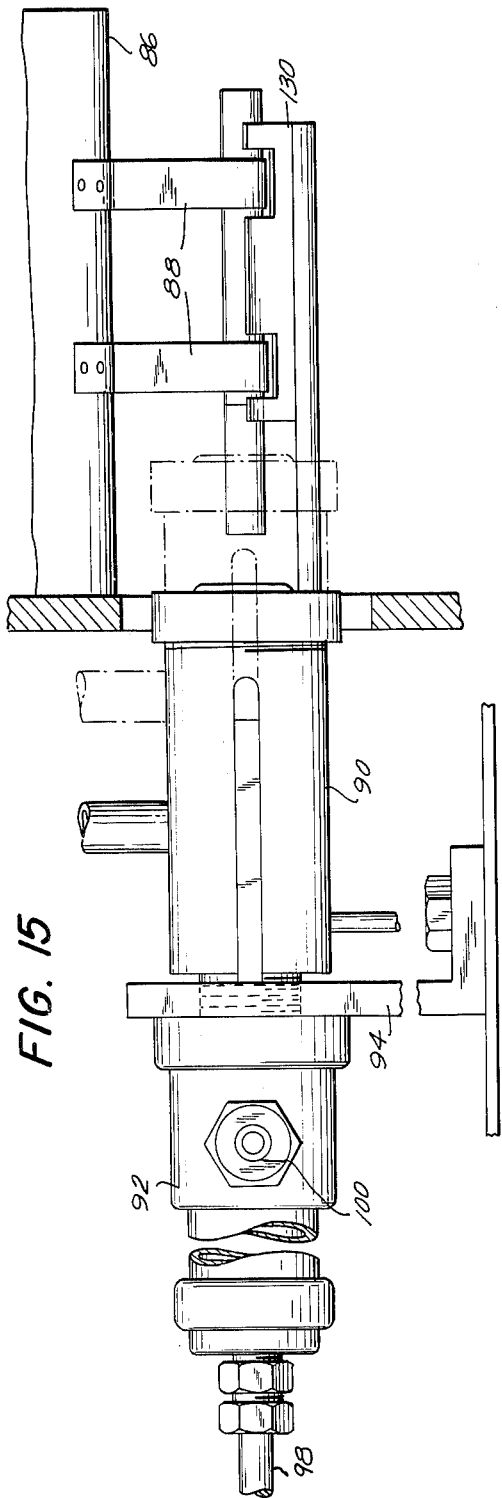
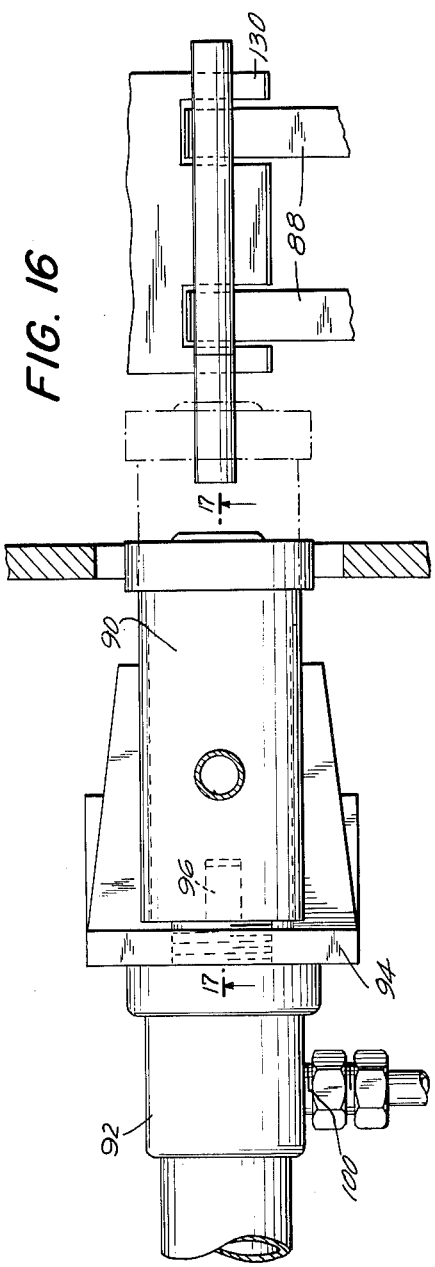
INVENTORS
CORNEAL LOUIS DOMECK, Jr.
ROBERT SPIVEY
BY
Kane, Dalsimer and Kane
ATTORNEYS

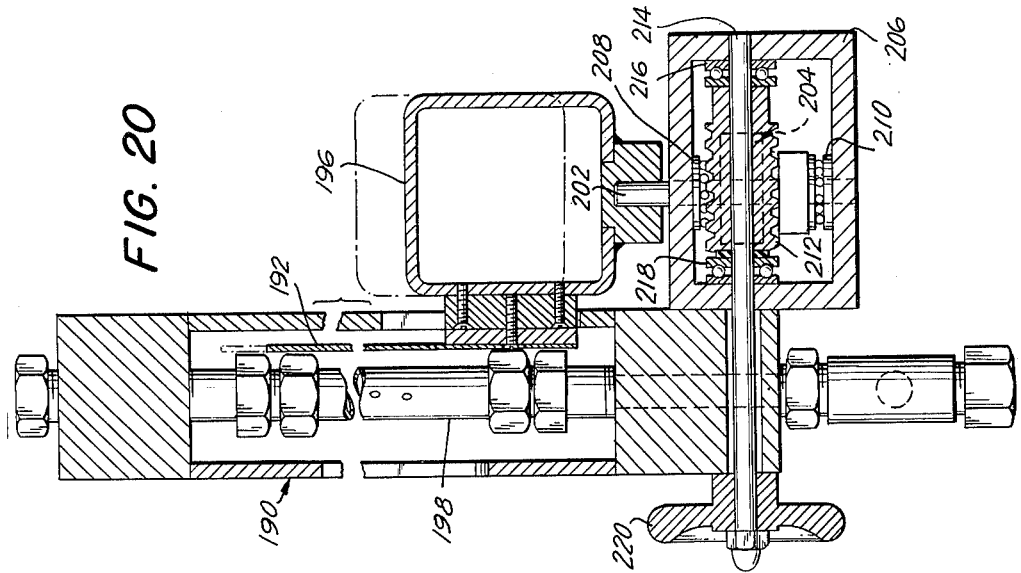
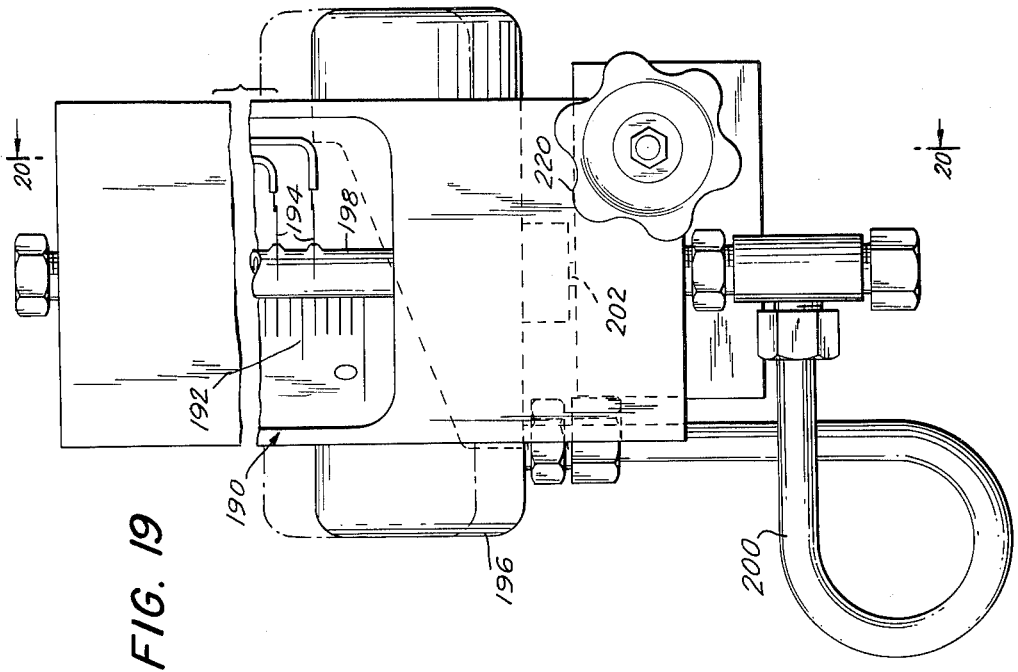

INVENTORS.
CORNEAL LOUIS DOMECK, JR.
ROBERT SPIVEY
BY
Kane, Dalsimer and Kane
ATTORNEYS

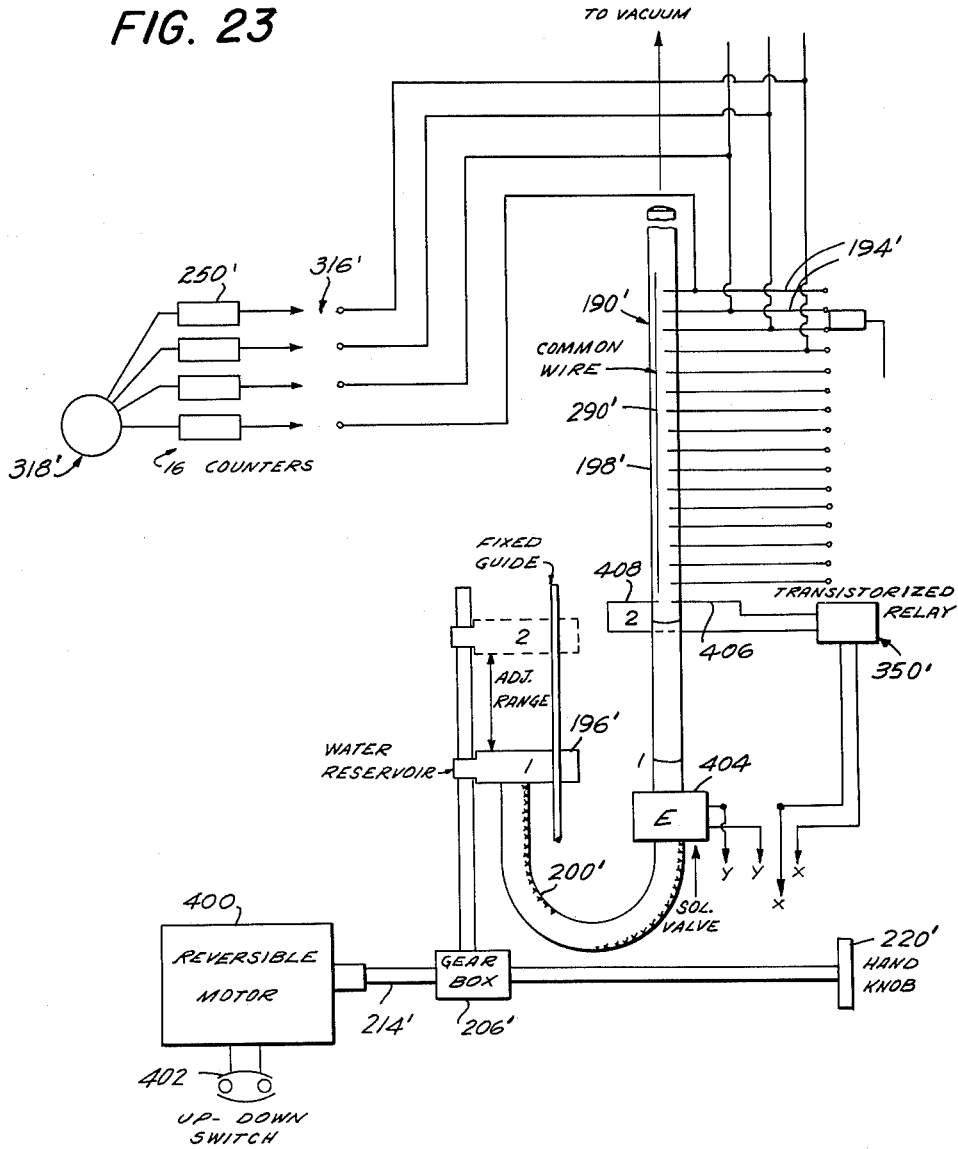

United States Patent Office 3,258,117
Patented June 28, 1966

3,258,117
AUTOMATIC MEANS FOR TESTING AND ASSORTING CIGARETTES ACCORDING TO POROSITY
Corneal Louis Domeck, Jr., Prospect, and Robert Spivey, Louisville, Ky., assignors to Brown & Williamson Tobacco Corporation, Louisville, Ky., a corporation of Delaware
Filed Aug. 27, 1963, Ser. No. 304,817
12 Claims. (Cl. 209—73)

The present invention relates generally to automatic testing apparatus and, more particularly, to such testing apparatus for measuring and responding to the pressure drop across cigarettes and filters.

In arriving at the physical characteristics and properties of a cigarette, and particularly of a filter cigarette, one of the most important factors that must be taken into consideration is the porosity, or the ease of drawing smoke through the cigarette. In selecting a filter or the general makeup of a cigarette such as its compactness and density, it is necessary to balance the filter's efficiency in retaining tars and nicotines against the ease of draw. For the manufacture of cigarettes, the draw resistance, therefore, of the cigarette is of essential importance, and the characteristics and properties throughout the manufacturing cycle should always remain the same particularly for smoker appeal.

The deviation of draw resistance in judging the quality of a cigarette is of great significance to the smoker. A cigarette which is difficult to draw is ordinarily unacceptable to the smoker. A cigarette with little draw resistance will ordinarily result in increased burning and faster entry of hot smoke into the smoker's mouth with possible unpleasant irritations.

When deciding what proportion of the finished cigarette should be composed of filter and which of tobacco, consideration should, of course, be given to the cut of the tobacco, the filling density and other factors. Experience has proven that the tobacco does have a significant effect upon the overall porosity of the cigarette. In the average case, the filter occupies about ⅓ of the overall cigarette length and accounts for ⅓ to ¾ of its resistance.

In cigarettes, the air flow is laminar. Accordingly, the flow is proportional to the pressure difference across the ends of the cigarette and, for that matter, the filter. This enables porosity, expressed in cubic centimeters per second at a constant pressure, to be easily correlated with pressure difference found at a standard flow rate. Accordingly, an approach to measuring porosity of cigarettes would entail a measurement of the pressure difference required to produce a given constant air flow rate.

It is, therefore, an object of this invention to provide an improved apparatus for fast and accurate measurement of the porosity or ease of drawing smoke through cigarettes and filters by determination of pressure drop at a constant flow rate.

Another object is to provide automatic testing apparatus adapted to sample, measure, count, record and then individually or collectively sort cigarettes according to the pressure drop across their respective lengths.

A further object is to provide for testing and detecting apparatus for responding to the pressure drop across the cigarette to determine variations of the cigarette from a standard and thereby provide a means for performing quality control during manufacturing operations.

Still another object is to provide for the measurement and recordation of pressure drop of cigarettes at prescribed intervals during the manufacturing process for statistical data useful in quality control, product uniformity at a rate significantly faster than techniques heretofore employed in the tobacco manufacturing industry.

An apparatus incorporating the teachings of the present invention will include a supply hopper for containing cigarettes or filterrods to be tested. These cigarettes are adapted to be individually directed to a holder by a feeding mechanism in the form of a turret. This holder is adapted to firmly engage and then subject a particular cigarette to a pressure differential across its ends to measure the cigarette porosity. The pressure drop across the cigarette being tested is first indicated on a manometer and then recorded on the readout of a counter. In this connection, the manometer is electrically coupled with the counter in such a manner that the counter will register the number of cigarettes having a particular pressure differential. Following the application of the pressure drop across the length of the cigarette, the holder will release the tested cigarette. The cigarette will then be transferred to a dispensing mechanism. This dispensing mechanism will include a number of gates ordinarily closed but adapted to open selectively, depending upon the particular pressure differential recorded. Thus, a gate will open in response to the measurement of a certain pressure drop across the tested cigarette so that this particular cigarette will be permitted access to a bin whereby cigarettes of a certain porosity will be collected. These cigarettes will then be subjected to further tests to determine the characteristics of the cigarettes being manufactured.

Other objects and advantages will become apparent from the following detailed description which is to be taken in conjunction with the accompanying drawings illustrating a somewhat preferred embodiment of the invention and in which:

FIG. 3 is a fragmentary top plan view of the drive mechanism contributing to the preset sequence of operations performed by the machine;

FIG. 4 is a cross sectional view taken along the line 4—4 of FIG. 3 showing the cigarette eject mechanism in its inoperative position;

FIG. 5 is a similar view showing the eject mechanism actuated to direct the tested cigarette from the holding station to the gating station;

FIG. 7 is a fragmentary elevational view partly in section illustrating the relationship between the cigarette to be tested and the holder at a rest position at which the balloon of the holder is at atmospheric pressure;

FIG. 8 is a similar view showing the holder moving forwardly about the cigarette and the balloon subjected to suction thereby assuming a deflated or collapsed position;

FIG. 9 shows the holder in its forwardmost position at which it is at rest with the balloon still deflated;

FIG. 10 shows the holder in its forwardmost position with the balloon at atmospheric pressure thereby firmly gripping or engaging the associated end of the cigarette;

FIG. 11 shows the holder in its forwardmost position and the balloon deflated following the application of a pressure drop across the cigarette;

FIG. 12 shows the balloon returning to the rearmost position and the balloon still deflated;

FIG. 13 shows the holder in its rearmost position with the balloon deflated and the tested cigarette discharged so that a fresh cigarette can be exposed to the same testing cycle;

FIG. 15 is an enlarged fragmentary side elevational view with certain parts broken away and removed for clarity while others are sectioned illustrating the holder and cigarette to be tested with the holder in its rearmost position, the forwardmost position depicted by phantom lines;

FIG. 16 is a top plan view of the parts illustrated in FIG. 15;

FIG. 19 is an enlarged front elevational view of certain parts broken away and removed of the manometer and means for indexing the manometer by raising and lowering the starting index;

FIG. 20 is a cross sectional view thereof taken along the line 20—20 of FIG. 19;

FIG. 23 is a diagrammatic view showing a further embodiment of manometer design with attendant changes in electrical circuitry of FIG. 21.

Figure 1:
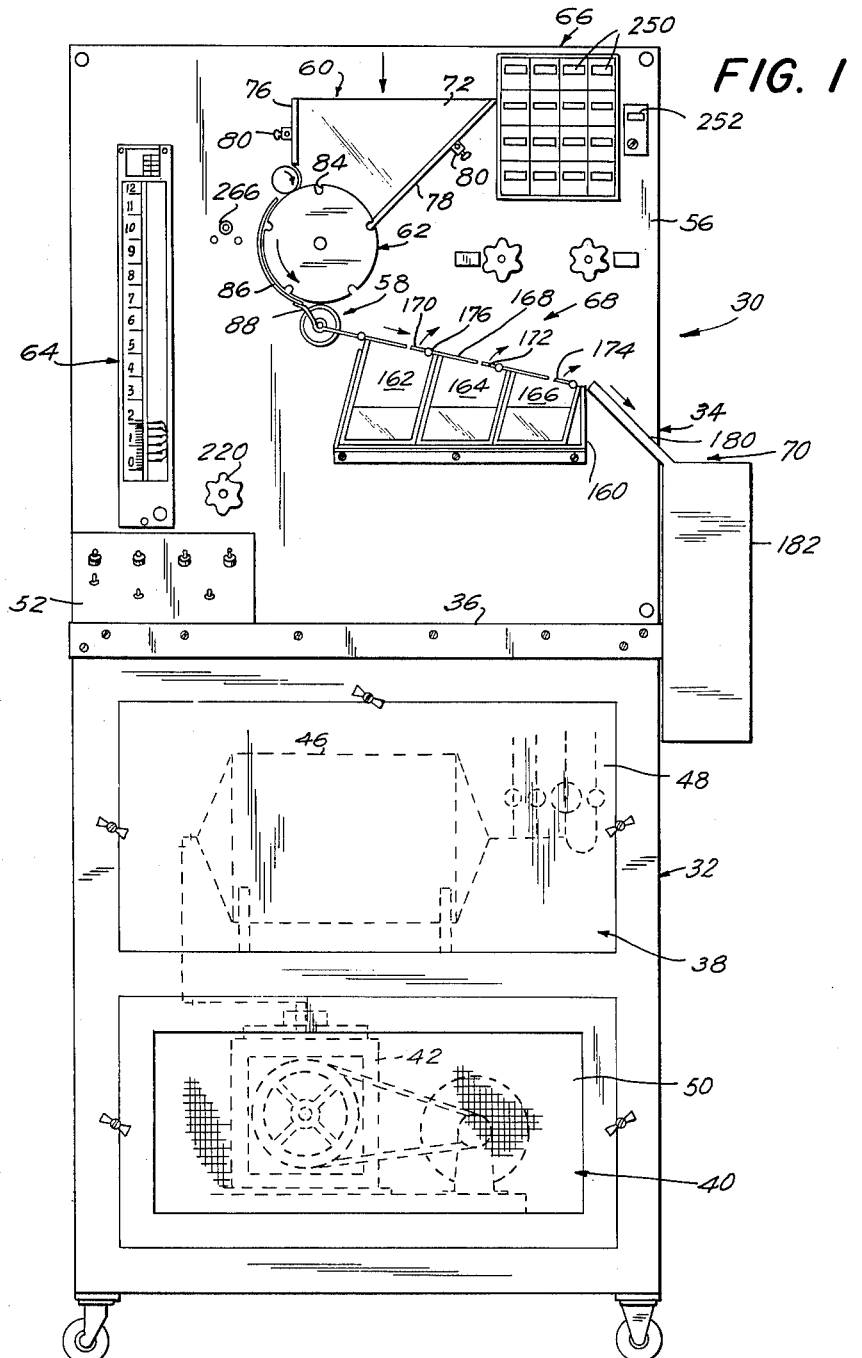
FIG. 1 is a front elevational view of a pressure drop machine according to the present invention with portions of the pneumatic circuitry shown in phantom.

The illustrated exemplary embodiment of this invention is incorporated into a cabinet 30 having a base section 32 and upper section 34 separated by a table or working area 36. The base section 32 is conveniently divided into an upper and lower compartment 38 and 40 for conveniently housing the motors and pumps for driving the machine. Thus, the vacuum pump of the pneumatic circuit 42 is suitably mounted and anchored in the lower compartment 40. The vacuum tank together with other plumbing of the pneumatic circuitry may be contained in the upper compartment 38. Each of the compartments 38 and 40 are provided with removable protective panels 48 and 50, respectively, which facilitate the assembly, removal and repair of the contained components. A control panel 52 is situated on the table 36 and includes conveniently located means such as switches and lamps for actuating and controlling the operation of the pressure drop machine.

The upper section 34 of the cabinet 30 is provided with a readily accessible interior compartment 54 which serves to accommodate the working parts of the several assemblies including drive motor 44 to be described in detail shortly particularly the drive mechanisms for the individual cigarettes, the pneumatic holding mechanism therefor, as well as the counting mechanism for registering the number of cigarettes falling within particular ranges of pressure drop. The front panel 56 of the top section 34 is segregated into defined stations. Thus, a sampling station 58 is included at which the individual cigarettes are pneumatically sampled or tested. The cigarettes to be tested are generally taken off the manufacturing line at prescribed intervals and placed in the hopper 60 and conducted to the sampling station 58 by means of the feeding mechanism 62. The individual cigarettes, upon sampling, are measured at the measuring station 64. This measurement is in terms of the pressure drop across the length of the cigarette or filter, as the case may be, with the measured pressure drops individually counted and recorded at the counting and recording station 66. Following the sampling of the cigarette, it is then transferred to a sorting station 68 at which point it is selectively collected or permitted passage to the reject station 70.

The hopper 60 is comprised of a front plate and rear plate 72 and 74 both of which may be formed from a substantially transparent or light-transmitting material. These panels are maintained at a substantially parallel spaced relationship by means of the vertically extending side plate 76 and diagonally disposed side plates 78. The front and rear plates 72 and 74 are spaced apart a distance sufficient to accommodate the particular lengths of cigarettes being tested. In this connection, the plates 76 and 78 are slotted as shown in order to adjust the location of the front plate relative to the rear plate. The hopper is suitably anchored to the front panel 56 by a sufficient number of nut and bolt assemblies 80, whereby the entire hopper is adjustable outwardly and inwardly relative to the turret 82 and, consequently, the extent of its bite. Under these circumstances, the fed cigarettes are adapted to be aligned with fingers 88.

Cigarettes contained in the hopper 60 are fed to the sampling station 58 by the feed mechanism at the feeding station 62 characterized by the turret drum 82 provided in its circumferentially extending periphery with a number of spaced grooves or recesses 84 for accommodating the individual cigarettes. The cigarettes transported by this drum 82 are prevented from prematurely dropping out of the accommodating recess by the arcuate guard 86. Extending from the lower end of this guard 86 are a pair of spaced cigarette catchers 88 which serve to retain the transported cigarette and present it to the holding station 58 at which the cigarette is sampled by having a pressure drop placed across its distal ends.

The holding station 58 operates to engage or grip the rear end of the cigarette, and subject the cigarette to a standard flow rate of air to thereby sample the cigarette causing the pressure drop to be measured at the station 64 and then recorded and counted at the station 66. The sampling station 58 includes a longitudinally reciprocal cigarette tip holder 90 movable to a forward position at which it is adapted to engage the tip of the cigarette and rearward position spaced therefrom. A pneumatic cylinder 92 is suitably mounted in a stationary manner by being coupled directly to a bracket 94 secured to a shelf 95 extending between the front and rear panels of the top section 34 of the cabinet 30. A piston having a piston rod 96 is reciprocal in the pneumatic cylinder 92 and coupled directly to the tip holder 90. Thus, reciprocation of the cylinder piston will correspondingly shift the tip holder through movement of the piston rod 96. In this connection, the rear of the cylinder is provided with a pneumatic coupling 98 as is the case with the front part of the cylinder which bears the pneumatic coupling 100. As will become evident shortly, when the rear of the cylinder is subjected to atmospheric pressure, the forward part of the cylinder is subjected to suction thereby causing the piston and piston rod to move in a forward direction. This is accomplished cyclically. Accordingly, upon the return stroke of the piston rod, the forward part of the cylinder is subjected to atmospheric pressure whereas the rear of the cylinder is exposed to suction thereby causing the piston to shift rearwardly. It should be understood that this reciprocal movement of the piston rod will produce corresponding movement and shifting of the tip holder 90.

The tip holder 90 of the sampling station 58, when in its forward position according to its reciprocatory cycle, is adapted to engage and then disengage the cigarette tip prior to and following, respectively, exposure of the cigarette to the standard pneumatic flow rate. Accordingly, the tip holder 90 is provided with a distendible balloon 102 which, when subjected to atmospheric pressure, is expanded and when suction is applied assumes a collapsed position. The balloon 102 is mounted by means of the adaptor 104 mounted in a hermetically sealed fashion in the holder 90 by means of the cap 106 provided with internal threads 108 which mate with the associated external threads 110 of the holder 90. The cap 106 is provided with a central opening 112 through which the adaptor 104 and mounted balloon 102 is adapted to be exposed. Annular gaskets 114 and 116 serve to complete the hermetic seal between the adaptor and shoulders provided on the holder 90. The interior face 118 of the balloon 102 is adapted to communicate with a source of suction through the radially extending apertures 120 provided in the adaptor 104, the chamber 122 defined by the adaptor and holder 90 and the longitudinally extending passageway 124 in the holder which itself is adapted to be coupled with the suction source. To permit free entry of the tip of the cigarette into and out of the holder 90, the inner face 118 of the balloon 102 is subjected to the suction source thereby resulting in collapse of the balloon against the associated surfaces of the adaptor 104. When it is desired to engage the tip of the cigarette in accordance with the prescribed sequence of operations, the internal face 118 of the balloon is subjected to atmospheric pressure at which it will assume a fully distended position firmly engaging the tip of the cigarette to thereby enable the standard flow rate of air to be passed through the cigarette.

The selected standard flow rate of air is applied to the cigarette by means of suction applied in the passageway 126 communicating with the suction source as well as the tip of the cigarette held by the balloon 102.

The sequence of operations at the sampling station 58 is illustrated in FIGS. 7 to 13, inclusively. When a cigarette to be tested is fed to the sampling station 58 by means of the mechanism constituting the feeding station 62, the cigarette will be supported by the catchers 88; and, at the same time, it will be spaced from the tip 90 which is disposed at its rearward at rest position with balloon 102 distended by being subjected to internal atmospheric pressure (FIG. 7). The piston rod 96 will then be shifted forwardly to move the tip holder 90 a corresponding amount. The internal face 118 of the balloon 102 will, at that time, be subjected to a drop in pneumatic pressure upon the application of suction to collapse the balloon essentially against associated surfaces of the adaptor 104 (FIG. 8). A tip holder with deflated balloon will eventually assume its forwardmost position relative to the tip of the cigarette to be tested (FIG. 9). The balloon 102 will then be distended upon removal of suction and application of atmospheric pressure to the internal face 118. Under these circumstances, the tip of the cigarette will be firmly engaged by the balloon 102 (FIG. 10). The sampling of the cigarette will now take place at which time the pressure drop is measured, counted and recorded pursuant to this invention. Following the sampling of the cigarette, the balloon 102 is deflated by applying a suction to the internal face 118 to thereby remove the engagement of the balloon with the cigarette tip (FIG. 11). The piston rod 96 is then retracted to consequently retract the tip holder 90 (FIG. 12). The tip holder 90 will eventually assume its rearward position and the suction removed from the internal face 118 of the balloon so that it may assume a distended position (FIG. 13). Prior to and simultaneously therewith, the sampled and tested cigarette will be ejected and, accordingly, removed from the sampling station 58 and transferred to the sorting station 68.

Figure 2:
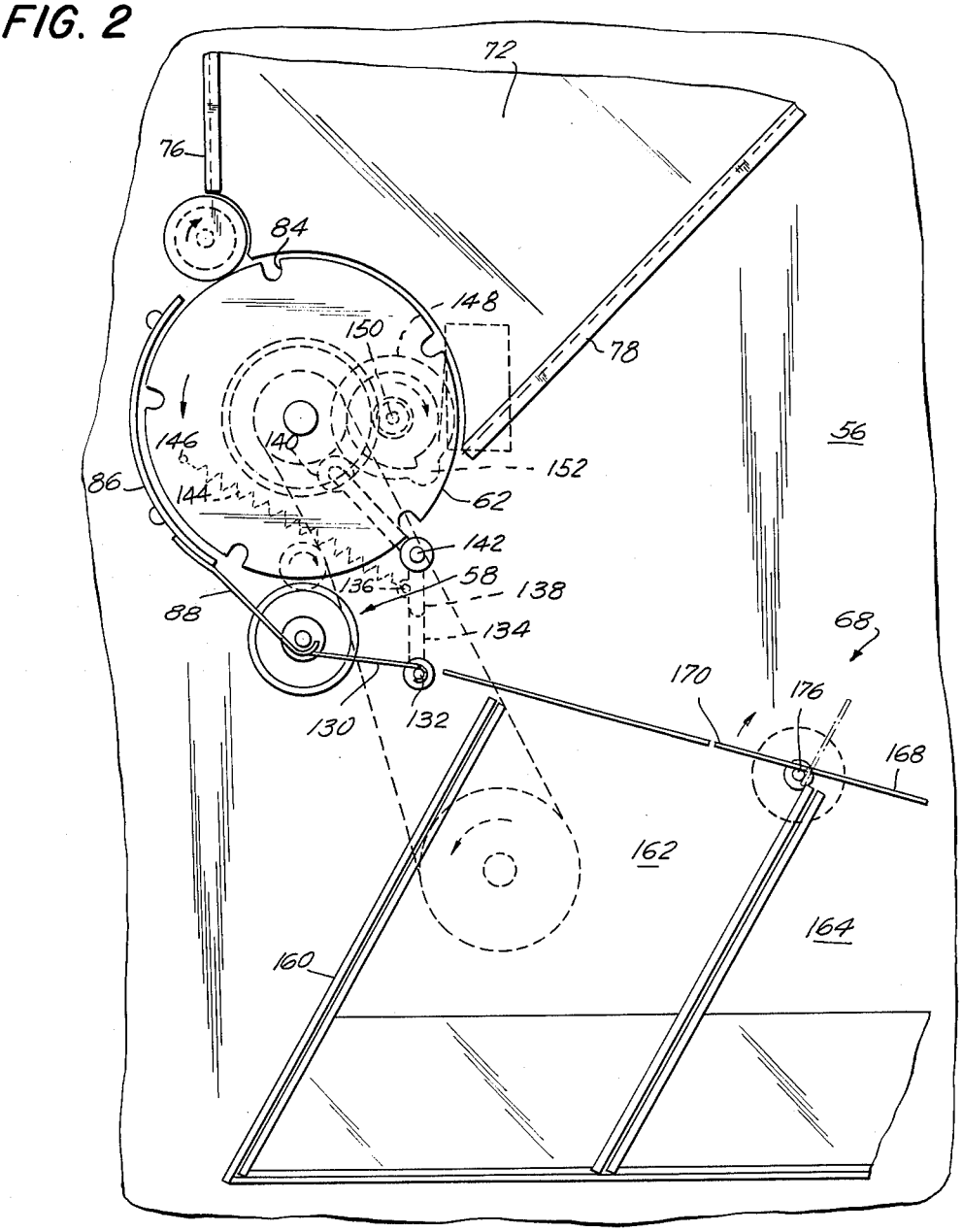
FIG. 2 is an enlarged fragmentary view of the cigarette feed and holder as well as elements of associated stations.
Figure 6:
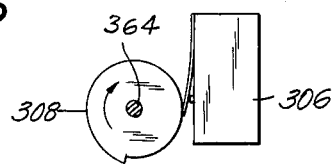
FIG. 6 is a cross sectional view taken along the line 6—6 of FIG. 3.
Figure 14:
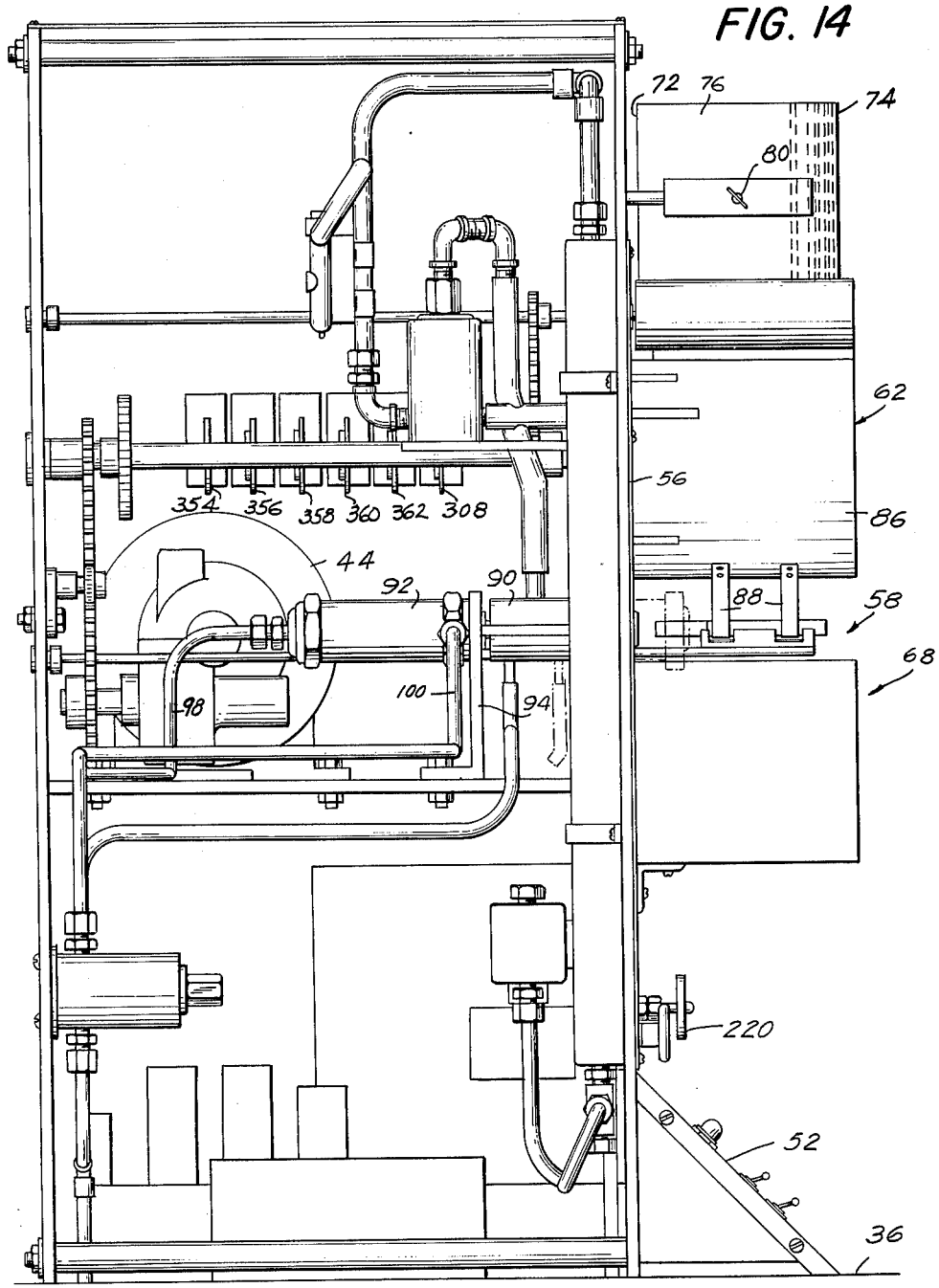
FIG. 14 is a side elevational view of the top section of the cabinet interior showing the components mounted therein.
Figure 17:
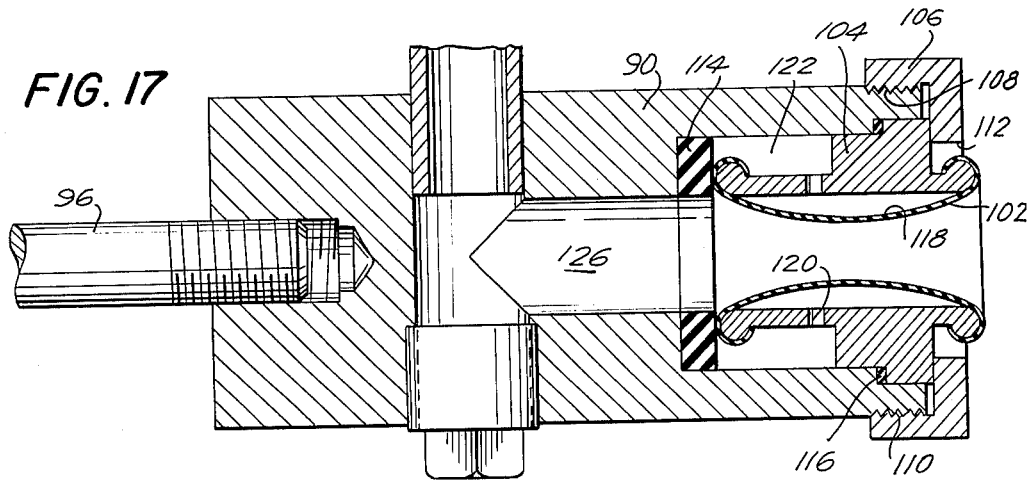
FIG. 17 is a further enlarged longitudinal sectional view of the holder taken along the line 17—17 of FIG. 16.
Figure 18:
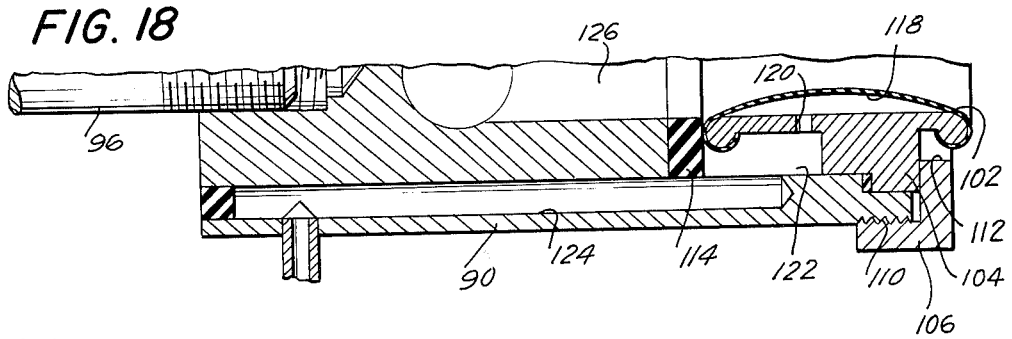
FIG. 18 is a fragmentary sectional view taken along the central axis of the holder of FIG. 17 showing the pneumatic connection and passageways for causing the inflation and deflation of the cigarette engaging or gripping balloon.

Referring now to the cigarette ejection station at which the sampled cigarette is removed from the sampling station 58 and transferred to the sorting station 68 illustrated in FIGS. 2, 4 and 5. This ejector station includes an ejector plate 130 suitably recessed to receive associated portions of the stationary catchers 88. This ejector plate 130 is pivotally mounted on a stationary shaft 132 and is provided with the laterally extending arm 134. This arm is in engagement with a projecting pin 136 extending from arm 138 of the cam follower 140 and pivotal shaft 142. Spring 144 extending between a fixed pin 146 and pin 136 serves to bias the arm 138 as well as the follower 140 in a clockwise direction. Under such circumstances, the follower 140 will engage the cam face of cam 148 and follow the contour thereof. The cam is rotatable in a clockwise direction as viewed in FIGS. 4 and 5 about the shaft 150. The rotation of the cam 148 is timed with respect to the operation of the components of the machine such that, when its lobe 152 comes in contact with the cam follower 140, the ejector 130 will be raised to discharge the cigarette supported by the catchers 88 after the completion of the cigarette sampling and testing cycle. The tested cigarette, under these circumstances, will be transferred to the sorting station 68.

The sorting station 68 receives the ejected and tested cigarette, sorts and collects the cigarettes tested according to the indicated pressure drop. This station is comprised of a tray mount 160 suitably bracketed or otherwise anchored to the front panel 56 of the upper section 34 of the cabinet 30. This mount is adapted to accommodate a number of cigarette receiving trays which, in accordance with the illustrated embodiment, may total 3, namely trays 162, 164 and 166 arranged in a side by side fashion as shown. The upper zone of the sorting station 68 is defined by a conveying surface 168 comprised of a number of interrupted plates leading from the sampling station 58 for purposes of providing a path of travel of the ejected and tested cigarettes. The interruption of the plates of the conveying surface 168 includes gates corresponding in number to the collecting trays employed and, in the instant embodiment, includes gates 170, 172 and 174. Each of these gates are pivotally mounted about a shaft 176 which, in turn, extends from a rotary solenoid 178 which, when energized, will lift the associated gate so that a cigarette travelling on the conveying surface 168 will engage the gate and fall into the particular collecting tray. The operation of the gate and the particular gate opened is controlled in a manner to be described shortly.

In the event it is not desired to sort cigarettes or a test cigarette may not fall within the desired ranges for collection, the conveying surface 168 will guide the tested cigarette to the reject chute 180 which leads into the hopper 182. The cigarettes collected in the hopper 182 will be disposed of as desired.

At the measuring station 64, the pressure drops across the sample cigarettes are indicated. The registered value is employed to trigger the mechanism located at the counting and recording station 66 as well as a particular gate located at the sorting station 68. The measuring station 64 will include a manometer 190 suitably calibrated as shown with an accompanying scale 192. The manometer is provided with a series of electrical contacts 194 extending along the length of the manometer or along that portion thereof used to indicate or register the pressure drops. The manometer 190 is provided with a selectively elevated liquid tank 196 adapted to be raised and lowered for purposes of adjusting the starting index of the manometer. In this connection, the scale 192 is suitably connected to the tank 196, both of which are now adjustable relative to the liquid column 198 with which the electrical contacts 194 are adapted to contact. In this connection, the liquid column 198 communicates with the interior of the tank 196 by means of the connecting flexible conduit and accompanying plumbing 200.

In order to permit adjustment of the tank 196 as well as the scale 190 in a substantially vertical direction, the tank 196 is provided with a downwardly extending shaft 202 which has keyed thereto a spiral gear 204. The shaft 202 is suitably journaled in the gear box 206 by means of the bearings 208 and 210. A transversely extending spiral gear 212 meshes with the gear 204. This second spiral gear 212 is keyed to shaft 214 also extending into the gear box 206 and suitably journaled therein by means of the bearings 216 and 218. The outer end of the shaft 214 extends through the forward face of the front panel 56 and is provided with an adjusting knob 220 which facilitates turning of the shaft 214 and, consequently, raising and lowering of the tank 196 and scale 192 and zeroing the manometer.

The counting and recording station 66 serves to count and record the number of cigarettes falling within a certain pressure drop value registered at the measuring station 64. Thus, station 66 will be provided with a series of readouts 250 which serve to indicate by counting the number of cigarettes falling within a certain pressure drop range. The totalizer readout counter 252 operates to record the total number of cigarettes tested. In the illustrated embodiment 16, readouts 250 appear in addition to readout 252, corresponding to the number of counters employed. As will be described in connection with the discussion of the electrical circuitry involved, the counters are actuated upon the application of a pulse generated when the pressure drop is indicated on a manometer 190.

Figure 22:
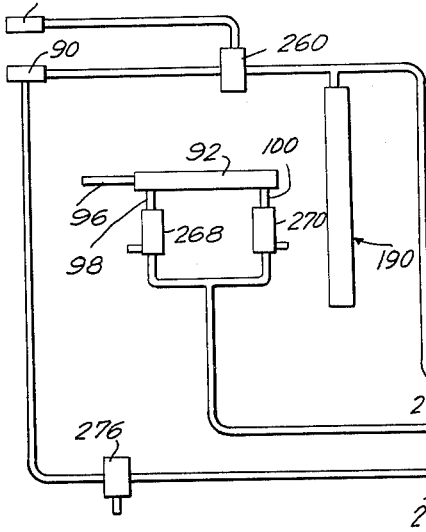
FIG. 22 is a diagrammatic view of the pneumatic circuit incorporated therein.

The pneumatic circuitry incorporated into the machine of this invention is diagrammatically illustrated in FIG. 22. The pneumatic circuit of the exemplary embodiment is a sub-atmospheric type system. The circuitry contains three independent circuits, with each circuit terminating at the entrance to the surge tank 46, which, in turn, is connected to the vacuum pump 42. The three independent circuits include the measuring circuit, the holder drive circuit, and the holder sealing circuit.

With respect to the measuring circuit, it should be initially understood that, under normal operating conditions of a satisfactory application of the machine of this invention, a vacuum of approximately 28.5 inches of mercury was maintained at the surge tank 46. The tank thus acted as a relatively constant source of value to pull air through the cigarette at the selected standard flow rate of 17.5 cc. per second. The flow path of air may be traced as follows. Air travels through the cigarette presented at the sampling station 58, through a directional solenoid valve 260, past the manometer 190 and then through needle valves 262 and 264. The needle valve 264 serves as a course flow control to reduce the air flow to approximately 20 to 30 cc. per second whereas needle valve 262 is the fine control employed to bring the air flow to the exact standard value of 17.5 cc. per second. With the cigarette in the holder 90 and the air flow adjusted as described, the manometer 190 which, in the stated particular application was of the 20 inch water type, will then indicate the pressure differential across the cigarette being tested at the sampling station 58.

When the solenoid valve 260 is energized (either manually or automatically as explained in the following description of the electrical circuitry involved), the air flow is diverted from the cigarette and is thereby permitted to pass through a glass capillary standard 266. The pressure drop across the standard 266 is then indicated on the manometer 190. Since the pressure drop of the standard is predetermined at the accepted flow of 17.5 cc. per second, any drift in pressure rating from the known value indicates a change in air flow.

Turning now to the holder drive circuit, it will be recalled that the cigarette to be tested at the sampling station 58 is inserted into the holder 90 by maintaining the cigarette in a fixed position by means of the catchers 88 and moving the holder to the cigarette. In the discussed application of this invention, the holder 90 was attached to the shaft 96 of a Schrader 1" stroke air piston. The direction of shaft motion is controlled by a pair of three-way solenoid valves 268 and 270. When the valve 268 is energized, air is evacuated from the front portion of the cylinder 92 through the coupling 98, through the needle valve 272. Under these circumstances, the piston rod 96 moves forwardly and forces the holder 90 in the same direction.

The rear of the piston remains at atmospheric pressure inasmuch as it is vented through the exhaust outlet of valve 270 through the coupling 100. In order to change direction of travel, the suction or vacuum is applied to the rear of the piston by energizing valve 270. At the same time, the front of the piston is returned to atmospheric pressure through the exhaust port on valve 268 through the coupling 98. The shaft 96, under such circumstances, will shift rearwardly. In passing, the valve 272 is used to adjust the air flow until a smooth action is obtained.

Turning now to the holder seal pneumatic circuit, it will be appreciated that, when the sealing balloon 102 is in a relaxed or distended position, the orifice defined thereby is too small to accept a cigarette tip. However, when a vacuum or suction is applied to the area between the balloon internal face 118 and adaptor 104, the balloon collapses and conforms to the configuration of the associated surfaces of the adaptor. Under these circumstances, the cigarette tip may readily be inserted into the holder to ultimately be firmly engaged or embraced by a relaxed and distended balloon 102. The operation of the balloon 102, between its relaxed or distended position and collapsed position, is determined by the operation of the solenoid valve 276. When the valve 276 is de-energized, the internal balloon face 118 is returned to atmospheric pressure through the exhaust port from this valve. The balloon 102, under these circumstances, will be returned to its relaxed position. With a cigarette inserted in the holder 90, while the balloon 102 is in a collapsed condition and then relaxed, the balloon 102 will conform to the perimeter of the cigarette tip and thus seal it into the measuring circuit. The valve 278 is employed as a control for the vacuum or suction applied to the balloon 102.

Figure 21:
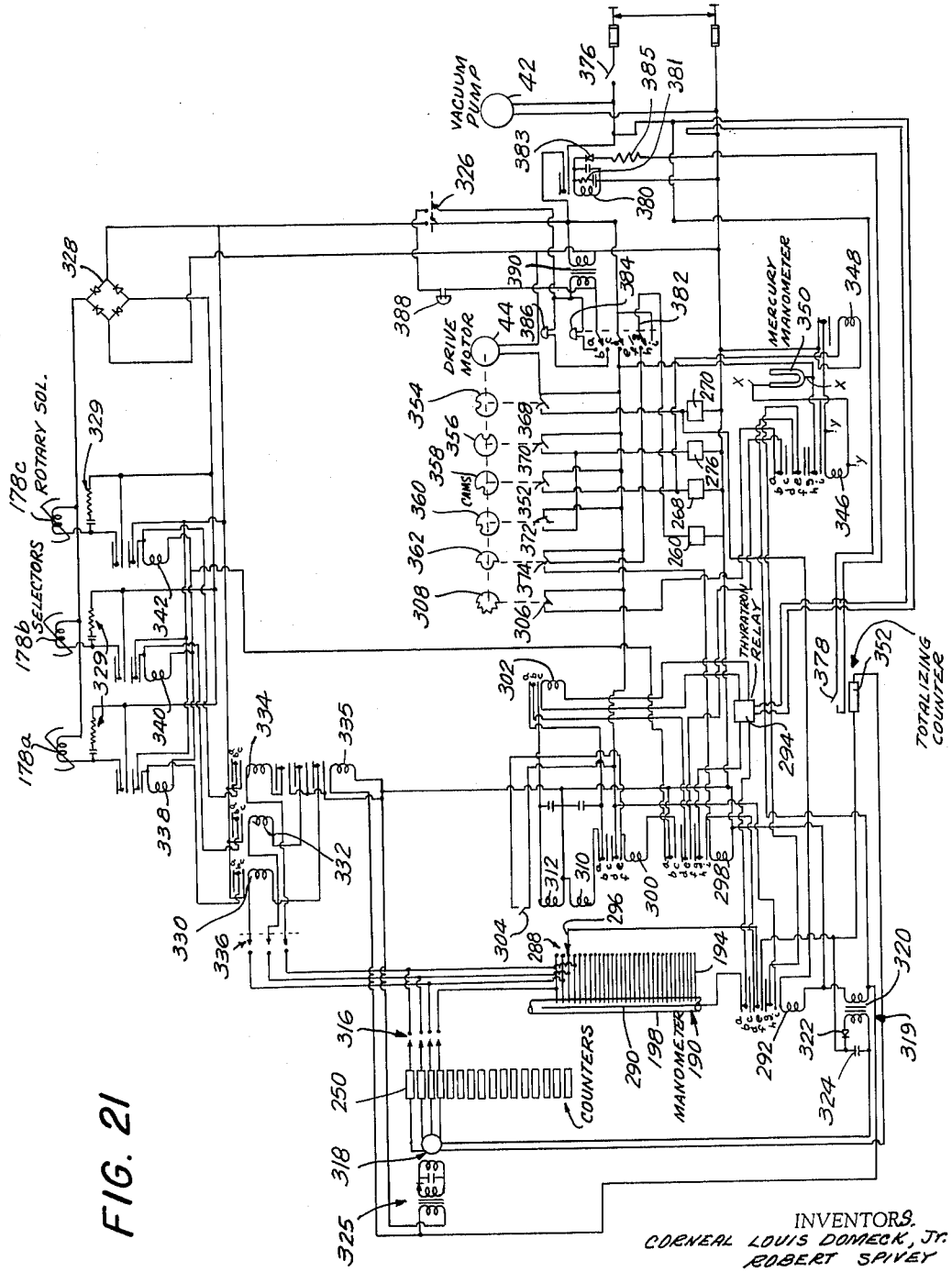
FIG. 21 is a diagrammatic view of the electric circuit of the testing apparatus.

Reference is now made to the electrical circuitry diagrammatically represented in FIG. 21. As each cigarette is delivered to the pneumatic measuring system of the sampling station 58 by means of the mechanism located at feeding station 62, the electronic circuitry contemplated by this invention automatically senses the indicated pressure drop of the cigarette and displays the data on a bank of readout counters. This electrical circuit also provides a means whereby cigarettes of three preset pressure drop values may be selected and sorted into collection bins at the sorting station 68 in accordance with an exemplary embodiment of sorting means. A bank of cam operated switches, to be discussed, serve to synchronize the action of the feeding station 62 and sampling station 58 with the measuring station 64.

The electrical circuitry includes a scanning circuit containing the pressure sensing element in the form of manometer 190 having built-in electrodes 194. In the illustrated embodiment found acceptable in actual practice, the manometer is a 20-inch water manometer with platinum electrodes inserted at one-quarter inch intervals. Each electrode, in turn, is connected to the contact points of a 38-point stepping (make-before-break contacts) relay 288. A common electrode 290 is positioned vertically along the inside wall of the manometer column 198 and is connected through relay 292 to the thyratron 294. The wiper arm 296 of the stepping relay 288 is also adapted to be connected to the thyratron circuit through relay 292 and relay 298. Relays 300 and 302, as well as switches 304 and 306, are also included in the measuring system circuit. In operation, the wiper arm 296 scans up or down the contacts of the relay 288 extending from the electrodes 194 positioned interiorly of the manometer column 198 until the wiper arm finds the level of the manometer fluid. The arm will then stop one position above the liquid level. The arm remains in this position until a new cigarette is inserted in the holder 90 for measurement and the scanning cycle is repeated.

It follows from the above that as each cigarette is inserted for measurement, the position of the wiper 296, at the time scanning commences, may be either below or above the level of manometer liquid. Since the action of the circuit is slightly different in each case, both shall be discussed separately below.

Assuming a cigarette having a pressure drop value lower than the preceding cigarette has been inserted into the holder 90, the wiper arm 296, under these circumstances, and, at this time, is positioned somewhere above the level of the liquid. By means of the bank of timing cams, to be discussed shortly, relay 298 connects the wiper contact 296 to the input of the thyratron relay 294. Since the level of the liquid in the manometer is below the contact point in question, the thyratron 294 is not activated and the contacts of relay 302, under these conditions, will remain in the up position as shown in FIG. 21. At this instant, cam 308 intermittently actuates its accompanying switch 306 thereby sending voltage pulses through relays 298 and 346 (which will now have their contacts in the down and up positions, respectively), to the center pole of relay 302. With the contacts of relay 302 in the up position as shown, the pulses will then be conveyed on through relay 300 to the subtract coil 310 of the stepping relay 288. The wiper arm 296, will, accordingly, begin to move downwardly toward the level of the liquid in the manometer column 198.

At the instant the wiper arm 296 comes in contact with an electrode 194 below the level of the liquid, the thyratron 294 will fire causing relay 302 to become energized thereby shifting its contacts to the down position thereby closing contacts 302b and 302c.

With this relay 302 energized, the voltage pulses are switched from the subtract coil 310 to the add coil 312 of the stepping relay 288. The wiper arm 296 will thereby move back one electrode 194 above the level of the liquid. Once again, with no liquid present between the electrode 194 in the manometer column 198 thyratron 294 is deactivated, relay 302 de-energized and the voltage pulses switched back to the subtract coil 310 incident to the closing of the switch contacts 302a and 302b. However, the cooperation of switch 304 and relay 300 prevent the wiper arm 296 from moving down again. Switch 304 is mounted physically on top of the add coil 312 and is activated each time the add coil is energized. When switch 304 is closed, even momentarily, relay 300 is energized and thereby locks in the down position opening contacts 300a and 300b. This opens the circuit to the subtract coil 310. When switch 304 has received the pulse, relay 300 is locked down through the closure of its contacts 300e and f. With relay 302 in the subtract position, and the circuit to the subtract coil open, the wiper arm 296 stops in this position, one contact point above the level of the liquid.

Assuming a cigarette has been inserted in the holder 90 having a pressure drop value higher than the preceding one, the wiper arm 296, at this time, is positioned somewhere below the level of the manometer liquid. When the thyratron 294 is activated through relay 298, relay 302 is energized and voltage pulses are applied to the add coil 312 and the wiper arm 296 begins to move upwardly. When the add coil 312 receives its first pulse, switch 304 closes causing the contacts on relay 300 to lock open or, in other words, results in the closing of contacts 300b and 300c and 300e and 300f. The wiper 296, under such circumstances, continues to move upwardly until it is one contact above the manometer liquid level, at which time the thyratron 294 is de-energized and relay 302 moves to the subtract coil position. However, with relay 300 locked open, no pulses will reach the subtract coil 310 and the wiper 296 stops in this position, one contact point above the level of the manometer liquid.

With respect to the readout system and circuitry, a successful application of the invention exemplified by the illustrated embodiment employed 16, 24-volt D.C. Sodeco counters and one predetermining or totalizer counter. These counters (except the totalizer) are all connected to a suitable switching means 316, for example, to the corresponding contact points 194 on the manometer column 198. In the mentioned successful application, a 16 pole 31 point rotary switch connected the counters to the contact points 194 on the manometer column. The switch 316 permits the counters 250 to be moved up and down the range of the manometer 190 to the common leads on the counters 250 all connected to a 32 pole D.C. relay 318 also contained in the embodiment under consideration. When this relay 318 is energized, all leads are made common at the same time and connected to one side of the D.C. voltage supply 319 which, in this case, contains the transformer 320, rectifier 322 and filtering capacitor 324. In this connection, the relay 318 is coupled with a similar D.C. voltage source 325.

When the scanning circuit has found the level of the manometer liquid and has stopped, relay 292 is energized through the actuation of the cam 354 and switch 368. This opens the input circuit to the thyratron 294 through the opening of contacts 292a, 292b, 292d and 292e and applies the direct current voltage to the wiper arm 296 as well as the 32 pole relay 318 of the illustrated embodiment as a result of the closure of contacts 292e and 292f. That particular counter 250 which is connected to the manometer electrode 194, at the point where the wiper arm 296 stopped, is energized and records one count. The direct current potential is also applied to the predetermining counter 352 and the count there is reduced by one from that of the preset value.

As previously discussed with respect to the illustrated embodiment, cigarettes of three different pressure drop values may be selected, if desired. In this connection, three rotary solenoids 178a, b and c are coupled to the gates or flippers 170, 172 and 174, respectively, positioned along the cigarette transport surface 168. When one of the solenoids is energized, the selected cigarettes are directed to a given bin or tray whether it be bin 162, 164 or 166. The option to select a particular gate and, consequently, bin is controlled by switch 326, mounted on the front panel 56, which supplies A.C. voltage to the diode bridge rectifier 328 which, in turn, supplies the accessory D.C. voltage which passed through the provided R.C. filtering networks 329 to operate the rotary solenoids 178a, b and c.

Simultaneously, with the application of the direct current voltage to be given counter 250 by means of the operation of relay 292, as previously described, this voltage is also placed across one of the three selector relays 330, 332 and 334 through the energization of relay 335 and closure of switch 336. The selection points on the manometer 190 may be varied up or down the column 198 by switch 336 which, in the illustrated embodiment, may assume the form of a three pole 31 point switch. The selector relays 330, 332 and 334 serve only as switches to control the voltage applied to the "hold-in" relays 338, 340 and 342, respectively. Upon receipt of a voltage pulse by the relay 332, for example, emanating from the wiper arm 296, this relay 332 is energized and, in turn, applies the voltage to relay 340 through its now closed contacts 332b and c. The relay 340, under these circumstances, will lock down and thereby apply a potential across the associated rotary solenoid 178b. The coupled flipper will rotate and open the passageway leading into the bin 164. The cigarette already sampled and tested at sampling station 58 and ejected therefrom will be directed into this bin 164. Since the ground return for relays 338, 340 and 342 is through relay 298, the rotary solenoid remains energized until this relay 298 is activated to break the circuit. The hold-in action is provided to enable the tested and ejected cigarette to have sufficient time to roll down the inclined transport surface 168 and drop into the particular bin.

A misfeed detector circuit is also contemplated by this invention and will include relays 346 and 348 together with a mercury filled U-tube manometer 350 having two contacts inserted in the wall thereof, one of these contacts being adjustable. One leg of the U-tube is connected to the pneumatic measuring system near the water manometer 190. The contact points in the mercury column are also adjusted that when the pressure in the measuring system falls to zero, which is the case when no cigarette is in the holder 90, the mercury in the tube manometer 350 completes the circuit to relay 346 and thereby causes its energization. This relay 346 will then lock down through its contacts 346h and 346i. In the particular embodiment of the invention under consideration, this relay 346 is a triple pole double throw type, with the circuit for the A.C. voltage scanning pulse connected to one pole 346b and the D.C. voltage to the counter circuit adapted to be connected to another pole 346c. With relay 346 locked down, the circuit to the pulse and counter system is opened as a result of the opening of the switch contacts 346a and 346b and 346d and 346e, thereby stopping the scanning action and preventing a readout on the counters 250. As will be appreciated, the ground return for this relay 346 is through relay 348. When the latter is energized by switch 352, relay 346 is released and free to detect a second misfeed or the scanning action is resumed if a cigarette is present in the holder 90.

As stated earlier, a bank of cam operated switches synchronize the action of the feeding station 62 and the pneumatic system with the electrical circuitry. The rotary cams 354, 356, 358, 360, 362 and 308 are mounted on shaft 364 geared directly to the drive shaft 366 of the turret or drum 82. Since both the feed system and the cam switches 368, 370, 372, 374 and 306, respectively, are driven from the same drive motor 44, any variations in speed would be inherent in both systems, thus maintaining synchronization between the two.

When main switch 376 is closed, the line voltage is applied to the vacuum pump 42 and to the thyratron circuit 294. In actual practice, approximately three to four minutes will be required before the pneumatic system reaches equilibrium thereby permitting the overall operation to be commenced. Before the operation is started, the predetermining counter 352 should be set for the desired number of cigarettes to be measured. As each cigarette is measured, the predetermining counter 352 subtracts one count from the preset value. When the counter 352 reads zero, switch 378 opens and thereby releases relay 380 after a suitable time delay afforded by R.C. circuit 381 to permit the last tested cigarette to be selected, thereby interrupting the line voltage to the drive motor 44. Under such circumstances, the operation of the machine will stop. It is necessary, therefore, to preset the number of counts desired on the totalizing counter 352 in order to energize relay 380. In passing, it will be noted that this relay 380 is a D.C. relay. Since an operating A.C. is present, the rectifier 383 is introduced into the circuit with current limiting resistor 385.

Upon energization of relay 380, the circuit is closed to the control switch 382 which, in the illustrated embodiment, has a triple-pole double-throw action with a neutral position in the center. One pole serves only to control the relatively low voltage panel lights 384, 386 and 388 whose voltage is supplied through the step down transformer 390. When the switch 382 is moved to the calibrated position, air flow direction solenoid 260 is energized through the closed switch contacts 382h and i. The air flow, under these circumstances, is directed to capillary standard 266. When the switch is moved to the run position, line voltage is applied to the drive motor 44 with the closing of the switch contacts 382d and e, and the unit is put into operation.

A typical cycle of operation will now be described with the starting point taken when the first cigarette has dropped into the saddle 88 at the sampling station 58 by the feed and guide mechanism of the feeding station 62. At this time, cam 356 activates its associated switch 370 causing solenoid valve 276 to energize and thereby open the balloon 102 in the holder 90. Immediately thereafter, switch 352 is activated by its cam 358 and the piston shaft 96 moves forwardly and, consequently, shifts the holder 90 in the same direction around the cigarette tip located at the sampling station 58. Switches 352 and 370 are then deactivated, and the balloon 102 will seal around the cigarette tip. During this operation, switch 374 by means of its association with its accompanying cam 362, has been applying line voltage to solenoid valve 260 to direct the air flow through the glass capillary standard 266 and not the holder 90. At the instant the balloon 102 is sealed, the switch 374 releases valve 260 and the air flow is applied to the cigarette.

Inasmuch as the center pole of switch 374 is connected to line voltage and as this valtage is removed from solenoid valve 260, it is immediately applied to relay 298 which will then close input to the circuitry of thyratron 294. The cooperation of cam 308 with its associated switch 306 will serve to commence the transmission of voltage pulses to the scanning circuit, the operation of which was previously described. In this connection, wiper arm 296 will stop at that electrode 194 one contact above the level of the manometer fluid in the column 198. The total time allotted for the scanning action is controlled by the speed of the drive assembly together with the indentation appearing in cam 362. The number of pulses per period is controlled by cam 308.

When the scanning period has ended, switch 374 again energizes valve 260 diverting the air flow back to the standard 266. Switch 372 will now energize valve 276 to open the balloon 102 to its deflated position. Substantially simultaneously therewith, switch 368, by means of its cam 354, will activate valve 270 causing the piston rod 96, together with the connected holder 90, to move backwardly. Substantially simultaneously therewith, the switch 368 will result in the energization of relay 292 thereby opening all connections to the input of the thyratron 294 and, at the same time, applies D.C. voltage to the wiper arm 296 as a result of the closing of contacts 292e and 292f. This direct current voltage pulse is then conveyed to the readout counters 250, as described earlier, as well as to the selection system 68. The cigarette at the sampling station 58 is then lifted from the saddles 88 by the mechanically controlled ejector 130 and directed down the incline surface 168 toward the collection bins or trays, and deposited therein in accordance with the particular gate actuated. This cycle of events is repeated for each cigarette to be tested.

In FIG. 23 an alternative embodiment of manometer 190' for the automatic pressure drop machine is illustrated also showing the changes in electrical circuitry of FIG. 21. In this connection, the manner of interconnecting these circuits is denoted by X—X and Y—Y. As will be developed, this proposed embodiment results in a simplified circuit and provides for a considerable increase in range of pressure drop operation. In passing, it should be understood that this invention contemplates the employment of a slant manometer known in the manometer art in cases where extreme sensitivity of measurement is desired.

As will be noted, the modified manometer 190' is provided with the desired number of increments represented by the stationary electrodes 194' which, in the illustrated successful application of the invention, totaled 16. Each electrode 194' is connected directly to a specific counter 250' which would total 16 in this instance. Thus, it will be noted that it is now possible to eliminate switch 316 contained in the earlier circuit. The desired number of selector increments or electrodes 194' are also tied in to the flapper or gate solenoids 178. Under such circumstances, the elimination of switch 336 would be optional and, if desired, specific pressure drops within the range could still be selected.

In the present embodiment, the manometer reservoir 196' is capable of being moved vertically thereby changing the liquid level at atmospheric pressure. The fixed probes or electrodes 194' in the manometer 190' can thus be made to represent any pressure drop range within the limits of the particular design. This change can thus be accomplished in a similar manner to that previously described in connection with the disclosure of FIGS. 19 and 20. Thus, like parts are designated with like numerals having accompanying primes. In addition, the adjustment can be automatically obtained as distinct from a mere manual adjustment by means of the operation of reversible motor 400 operated off of the switch 402.

In addition, this embodiment proposes the incorporation of the previously described mercury misfeed detector into the manometer structure 190' itself, as illustrated. Accordingly, the mercury manometer 350 is replaced in essence by circuitry which would include the transistorized relay 350' adapted to be energized when liquid is not present and normally open solenoid valve 404. Thus, two additional probes 406 and 408 are inserted below the lowest pressure drop sensing increment. If a cigarette fails to feed to the sampling station 58, the manometer 190' will begin to fall towards zero. When it falls to the increment between the two misfeed probes 406 and 408, the transistorized relay 350' is activated to close the solenoid 404 to thereby cancel the counter circuit in a manner similar to that accomplished through the operation of the mercury manometer 350. The liquid level is trapped in the manometer 190' until the cycle switches back to the sensing of the standard pressure drop as represented by the standard 266. Prior to this, the hold position of the solenoid 404 is cancelled so that the manometer 190' may go again to the standard value which may be located approximately in the center of the series of fixed probes or electrodes 194'.

As previously stated, this invention has application to the measurement of pressure drops across cigarettes. In addition, it is contemplated by this invention to measure the pressure drop across filter rods. Because of the higher resistance of the material filling the rod, an error would ordinarily be introduced by air bleeding through the paper. To minimize this effect, the holder 90 at the sampling station 58 should be designed to completely enclose the rod. Under these circumstances, provisions are made to obtain the desired amount of displacement of the holder 90 by means of the connected cylinder 92 and displaceable piston 96. In order to assure complete coverage and sealing of the rod by means of the elongated balloon 102 when the balloon is in its relaxed condition, a slight positive pneumatic pressure may be introduced against the interior face 118 of a balloon that is ordinarily slightly larger in circumference than the rod to be measured. This positive pressure would cause the balloon to conform to the entire length of the rod. Since the incorporation of such provisions is capable of being readily developed by those skilled in the art with the instant disclosure available, details of this embodiment are considered unnecessary at this time. Further ramifications of this embodiment would include positive pneumatic pressure ejection means for ejecting the tested filter rod at the sampling station 58. Instead of deflecting the ejected and tested rods into collecting bins, as previously described, the rods may be ejected and then selected for collection by one of several other methods capable of being introduced or incorporated into the machine of this invention.

Thus, the numerous aforenoted objects and advantages are most effectively attained. Although a single somewhat preferred embodiment of the invention has been described and disclosed in detail herein, it should be understood that this invention is in no sense limited thereby but its scope is to be determined by that of the appended claims.

We claim:

1. A device for testing or measuring a cigarette or like rod comprising: a hopper means containing a number of cigarettes to be tested; a feeding means for feeding individual cigarettes from said hopper means; a sampling station for receiving the individual cigarettes and including sealing means for sealing one end of a cigarette fed from said hopper means and measuring means for testing the pressure drop across the cigarette; and ejection means for ejecting the individual cigarettes after they have been tested; conveying means for transporting the individual tested ejected cigarettes; and counting means coupled with said measuring means for counting the number of cigarettes having certain values of measured pressure drops, said counting means including a plurality of counters each of which are calibrated to respond to a particular pressure drop value measured at said sampling station.

2. A device for testing or measuring a cigarette or like rod comprising: a hopper means containing a number of cigarettes to be tested; a feeding means for feeding individual cigarettes from said hopper means; a sampling station for receiving the individual cigarettes and including sealing means for sealing one end of a cigarette fed from said hopper means and measuring means for testing the pressure drop across the cigarette; and ejection means for ejecting the individual cigarettes after they have been tested; conveying means for transporting the individual tested ejected cigarettes; sorting means operatively associated with the conveying means for sorting the tested cigarettes according to the measured value of pressure drop; and counting means coupled with said measuring means for counting the number of cigarettes having a certain value of pressure drop tested, said counting means including a plurality of counters each of which are calibrated to respond to a particular pressure drop value measured at said sampling station.

3. A device for testing or measuring a cigarette or like rod comprising: a hopper means containing a number of cigarettes to be tested; a feeding means for feeding individual cigarettes from said hopper means; a sampling station for receiving the individual cigarettes and including measuring means for testing the pressure drop across the cigarette; and a catching means receiving the individual cigarettes for testing and holding them in a position ready for testing at said sampling station, and said sampling station including a holder for embracing the tip of the cigarette and air flow means for passing a given flow of air through the cigarette, said holder including a balloon coupled therewith and means for distending said balloon at such time as said holder is to embrace the cigarette tip to cause said balloon to firmly engage the cigarette tip and to place said balloon in a collapsed condition before and after said tip is to be embraced by the holder to thereby facilitate assumption of the embracing relationship, and said measuring means being coupled with said air flow means for measuring the pressure drop across the cigarette incident to said flow of air through the cigarette; ejection means for ejecting the individual cigarettes after they have been tested; conveying means for transporting the individual tested ejected cigarettes; sorting means operatively associated with the conveying means for sorting the tested cigarettes according to the measured value of pressure drop; and counting means for counting the number of cigarettes having a certain value of pressure drop tested.

4. The invention in accordance with claim 3 wherein said sampling station further includes a pneumatic piston and cylinder arrangement the piston of which is coupled with said holder and means for actuating said arrangement to cause said holder to shift towards said cigarette and be telescoped around said cigarette tip and to shift said holder away from said cigarette following testing of this cigarette, and means for synchronizing the operation of said arrangement and the means for distending and collapsing said balloon.

5. A device for testing or measuring a cigarette or like rod comprising: a hopper means containing a number of cigarettes to be tested; a feeding means for feeding individual cigarettes from said hopper means; a sampling station for receiving the individual cigarettes and including measuring means for testing the pressure drop across the cigarette and comprising a manometer; ejection means for ejecting the individual cigarettes after they have been tested; conveying means for transporting the individual tested ejected cigarettes; sorting means operatively associated with the conveying means for sorting the tested cigarettes according to the measured value of pressure drop; counting means for counting the number of cigarettes having a certain value of pressure drop tested;

and means for electrically coupling said manometer with said counting means and coupling said manometer with said sorting means.

6. A device for testing or measuring a cigarette or like rod comprising: a hopper means containing a number of cigarettes to be tested; a feeding means for feeding individual cigarettes from said hopper means; a sampling station for receiving the individual cigarettes and including measuring means for testing the pressure drop across the cigarette; ejection means for ejecting the individual cigarettes after they have been tested; conveying means for transporting the individual tested ejected cigarettes; sorting means operatively associated with the conveying means for sorting the tested cigarettes according to the measured value of pressure drop, said sorting means including a plurality of bins and gating means operatively associated with said conveying means for directing the tested individual cigarettes traveling on the conveying means to a particular bin selected for holding those tested cigarettes having a prescribed pressure drop value; and counting means for counting the number of cigarettes having a certain value of pressure drop tested.

7. A device for testing or measuring a cigarette or like rod comprising: a feeding means for feeding individual cigarettes to be tested; a sampling station for receiving the individual cigarettes and testing for the pressure drop across the cigarette, said sampling station comprising means for causing a predetermined rate of air flow through the cigarette to be tested, measuring means for measuring the pressure drop across said cigarette incident to said air flow, said measuring means being a water manometer including spaced electrodes communicable with the interior of the manometer column, and means coupled with said measuring means for responding to a predetermined value of pressure drop registered by said measuring means, said means responding to the pressure drop registrations on the measuring means being counters electrically coupled with the manometer through said electrodes and adapted to respond to pressure drops registered on said manometer and count the number of cigarettes having a predetermined value of pressure drop.

8. A device for testing or measuring a cigarette or like rod comprising: a feeding means for feeding individual cigarettes to be tested; a sampling station for receiving the individual cigarettes and testing for the pressure drop across the cigarette, said sampling station comprising means for causing a predetermined rate of air flow through the cigarette to be tested, measuring means for measuring the pressure drop across said cigarette incident to said air flow, said measuring means being a water manometer including spaced electrodes communicable with the interior of the manometer column, means coupled with said measuring means for responding to a predetermined value of pressure drop registered by said measuring means, means being provided for adjusting the starting index of the manometer, said adjusting means including a reversible motor means with superimposed manual adjusting means for changing the elevation of the liquid column in said manometer.

9. A device for testing or measuring a cigarette or like rod comprising: a feeding means for feeding individual cigarettes to be tested; a sampling station for receiving the individual cigarettes and testing for the pressure drop across the cigarette, said sampling station comprising means for causing a predetermined rate of air flow through the cigarette to be tested, measuring means for measuring the pressure drop across said cigarette incident to said air flow, means coupled with said measuring means for responding to a predetermined value of pressure drop registered by said measuring means, and means being further provided for passing the standard rate of air flow through a standardizing pressure drop means during the period between measuring the pressure drops of the sequentially fed cigarettes.

10. A device for testing or measuring a cigarette or like rod comprising: a feeding means for feeding individual cigarettes to be tested; a sampling station for receiving the individual cigarettes and testing for the pressure drop across the cigarette, said sampling station comprising means for causing a predetermined rate of air flow through the cigarette to be tested, measuring means for measuring the pressure drop across said cigarette incident to said air flow, means coupled with said measuring means for responding to a predetermined value of pressure drop registered by said measuring means, and misfeed detection means being provided for deactivating said measuring means when an individual cigarette is misfed to the sampling station.

11. The invention in accordance with claim 10 wherein said misfeed detection means includes a mercury manometer, means for coupling said mercury manometer to said means for causing air flow, and electrical means coupling said mercury manometer with said measuring means such that said measuring means is deactivated when a cigarette is misfed and said air flow is caused to occur.

12. The invention in accordance with claim 10 wherein said measuring means is a manometer and said misfeed detection means includes electrical probe means mounted interiorly of said manometer and adapted to be contacted by the manometer liquid, and electrical means for coupling said probe means to said measuring means such that said measuring means is deactivated when a cigarette is misfed and said air flow is caused to occur.

References Cited by the Examiner

UNITED STATES PATENTS

| 2,061,744 | 11/1936 | Temple | 73—45.1 |
| 2,543,790 | 3/1951 | Maher et al. | 73—45.2 X |
| 2,951,364 | 9/1960 | Sherrill | 73—45.2 |
| 3,115,767 | 12/1963 | Tyrell et al. | 73—38 |
| 3,189,178 | 6/1965 | Calleson et al. | 209—74 X |

FOREIGN PATENTS

| 385,476 | 12/1932 | Great Britain. |
| 928,743 | 6/1963 | Great Britain. |
| 937,426 | 9/1963 | Great Britain. |

M. HENSON WOOD, JR., *Primary Examiner.*

A. N. KNOWLES, *Assistant Examiner.*